United States Patent

Casal et al.

[11] Patent Number: 5,974,259
[45] Date of Patent: Oct. 26, 1999

[54] DATA PROCESSING SYSTEM AND METHOD OF OPERATION HAVING INPUT/OUTPUT DRIVERS WITH REDUCED POWER CONSUMPTION AND NOISE LEVELS

[75] Inventors: Humberto Felipe Casal; Kurt Alan Feiste, both of Austin; T. W. Griffith, Jr., Cedar Park; Larry Edward Thatcher, Austin, all of Tex.

[73] Assignee: International Business Machines Corporation, Armonk, N.Y.

[21] Appl. No.: 08/715,694

[22] Filed: Sep. 18, 1996

[51] Int. Cl.[6] .................................. G06F 1/00; G06F 1/04
[52] U.S. Cl. ........................................ 395/750.01; 395/555
[58] Field of Search .................................. 326/21, 28, 93, 326/96, 26; 327/141, 144, 145; 395/750.04, 750.01, 555, 556, 800.32, 800.38

[56] References Cited

U.S. PATENT DOCUMENTS

| | | | |
|---|---|---|---|
| 4,371,925 | 2/1983 | Carberry et al. | 364/200 |
| 4,587,445 | 5/1986 | Kanuma | 307/443 |
| 4,613,771 | 9/1986 | Gal | 307/443 |
| 4,656,370 | 4/1987 | Kanuma | 307/303 |
| 4,661,928 | 4/1987 | Yasuoka | 365/189 |
| 4,665,483 | 5/1987 | Ciacci et al. | 364/200 |
| 4,709,329 | 11/1987 | Hecker | 364/200 |
| 4,724,340 | 2/1988 | Sood | 307/443 |
| 4,725,747 | 2/1988 | Stein et al. | 307/579 |
| 4,857,765 | 8/1989 | Cahill et al. | 307/443 |
| 5,122,693 | 6/1992 | Honda et al. | 307/480 |
| 5,442,775 | 8/1995 | Whitted, III et al. | 395/560 |
| 5,481,555 | 1/1996 | Wade et al. | 371/57.2 |
| 5,532,633 | 7/1996 | Kawai | 327/144 |
| 5,646,543 | 7/1997 | Rainal | 326/26 |
| 5,666,497 | 9/1997 | Milhaupt et al. | 395/309 |
| 5,670,899 | 9/1997 | Kohdaka | 326/97 |
| 5,685,005 | 11/1997 | Garde et al. | 395/800.36 |
| 5,737,548 | 4/1998 | Yach et al. | 395/308 |
| 5,774,702 | 6/1998 | Mitusishi et al. | 395/556 |
| 5,802,317 | 9/1998 | Wiseman et al. | 395/280 |

FOREIGN PATENT DOCUMENTS

| | | | |
|---|---|---|---|
| 59-148426 | 8/1984 | Japan | H03K 17/00 |
| 60-130920 | 7/1985 | Japan | H03K 19/03 |

OTHER PUBLICATIONS

Varma,. A., et al., "Rearrangeable Operation of Large Crosspoint Switchng Networks," IEEE Trans. on Communications, vol. 38, No. 9, pp. 1616–1624, Sep. 1990.

Senthinathan, R., et al., Effects of Skewing CMOS Output Driver Switching on the "Simultaneous" Switching Noise, Proc. of the 11th IEEE/CMHT Int'l. Electronics Manufacturing Technology Symposium, IEEE, pp. 342–345, Sep. 1991.

*Primary Examiner*—Krisna Lim
*Assistant Examiner*—Andrew Caldwell
*Attorney, Agent, or Firm*—Morgan & Finnegan, J.C. Redmond, Jr.; A. England

[57] ABSTRACT

A data processing system has a memory bus and a system input/output (I/O) bus including I/O drivers. The memory and I/O buses are controlled by a central processor unit (CPU) for transferring data therebetween and to the I/O drivers. A central clock provides clock signals to the CPU, the memory bus and the I/O bus. The central clock further provides memory and I/O phase alignment signals to the CPU, the alignment signals indicating to the CPU when the start of the CPU clock cycle coincides with the start of a memory bus clock cycle or I/O bus clock signal. Circuit means responsive to the phase alignment and CPU clock signals initiate the transfer of data to the memory and I/O data buses in alternate CPU clock signals to reduce the number of I/O pin switching at any given time thereby reducing the noise and power consumption at the I/O pins and in the system.

20 Claims, 2 Drawing Sheets

DATA PROCESSING SYSTEM AND METHOD OF OPERATION HAVING INPUT/OUTPUT DRIVERS WITH REDUCED POWER CONSUMPTION AND NOISE LEVELS

BACKGROUND OF INVENTION

1. Field of Invention

This invention relates to data processing systems. More particularly, the invention relates to data processing systems having input/output drivers with reduced power consumption and noise levels.

2. Description of the Prior Art

In data processing systems using CMOS technology, power consumption and noise generation are dominated by switching circuit nodes. Input/output pins cause even greater power and noise disturbances during switching because of the amount of current required to charge the external buses capacitances. In such systems, memory buses and system input/output (I/O) buses are typically clocked with central processing unit (CPU) clock cycles at some multiple of one external bus clock cycle because external buses cannot be switched as quickly as the internal circuits of the CPU. For example, the ratio of CPU to external bus clock cycles may be 2 to 1, 3 to 1, 4 to 1, 3 to 2, etc. Because of the large number of I/O pins utilized for the buses, a power surge occurs with accompanying noise when the bus drivers for the memory and system I/O simultaneously change value.

Prior art attempts to control the effects of the power surge and noise in integrated circuits include the following:

U.S. Pat. No. 4,587,445 issued May 6, 1986, discloses a data output circuit capable of reducing the level of noise voltage generated through the power source line when the logic data are updated. The data output circuit includes means for preventing more than half the output lines from transitioning simultaneously.

U.S. Pat. No. 4,613,771 issued Sep. 23, 1986, discloses an integrated circuit having improved noise immunity. The circuit includes three power busses in the circuit, the busses being parasitically coupled in the substrate with proportioned parasitic resistive and capacitive coupling to reduce output noise.

U.S. Pat. No. 4,656,370 discloses an integrated circuit with divided power supply wiring which can practically avoid noise problems due to induced counter electromotive force of power supply and ground lines. Since the power supply and ground lines in the circuit are divided into plural sets and each set is provided with independent wirings, the magnitude of current change in each wiring and the value of each wiring inductance can be small. From this, switching noises caused by simultaneous similar data changes can be suppressed thereby avoiding erroneous operation.

U.S. Pat. No. 4,661,928 issued Apr. 28, 1987, discloses an output buffer in which inductive noise is suppressed without making the data output speed slow. An inductive noise at the voltage terminal for the output circuit is suppressed by providing a noise suppression signal between the output voltage terminal and the gate of the output transistor.

U.S. Pat. No. 4,724,340 issued Feb. 8, 1988 discloses an output circuit in which a switching noise is reduce by presetting pairs of output lines to opposite logic states. A first output signal is provided at a first output terminal in one of two possible logic states in response to a control signal. A second output signal on a second output terminal is at one of two possible logic states and responds to the control signal. A predispositioned circuit coupled to the first and second outputs causes the outputs to be at different logic states at least immediately prior to the first and second output signals appearing on the first and second output terminals.

U.S. Pat. No. 4,725,747 issued Feb. 16, 1988, discloses an integrated circuit which substantially eliminates or reduces the disadvantages and problems associated with switching noise and high-speed integrated circuits. A circuit includes a substrate having a plurality of transistor regions and an elongated gate having a predetermined resistance. A signal applied to one end of the gate propagates along the length of the gate during a predetermined time interval. The transistor regions sequentially conduct a response to the signal propagating along the elongated gate until all of the transistor regions are conductive. The sequential conduction of the transistor region reduces the generation of output noise by eliminating the change of output current with respect to time.

U.S. Pat. No. 4,857,765 issued Aug. 15, 1989, discloses a noise control system in an integrated circuit chip which controls noise by dividing drivers into groups and switching each group at different times. Time driver gating signals are used in conjunction with physical grouping of driver circuits on the chip to isolate switching drivers from quiet drivers. The grouping of drivers minimizes detrimental effects usually caused by noise that is generated when driver circuits switch.

A Japanese publication 59-148426, published Aug. 25, 1984, discloses a circuit for controlling timing of simultaneous operations to control noise.

A Japanese publication JP60-130920, published Jul. 12, 1985, discloses an integrated logic circuit which prevents the noise margin and reliability from being decreased by connecting each one of a plurality of capacitors where at least one capacitor has differing capacitances from the other capacitors at the other output logical gates.

While the prior art addresses problems of noise and power surges in integrated circuits, none of the art discloses controlling system elements in a data processing system to reduce noises and power surges at the pin I/O's of the system. Controlling the system elements of a data processing system in lieu of special circuits and devices would improve the performance of such data processing systems without the expense of added cost.

SUMMARY OF INVENTION

An object of the invention is an improved data processing system and method of operation which reduces power consumption and noise from simultaneous switching of input/output (I/O) drivers.

Another object is an improved data processing system and method of operation having power consumption more evenly distributing in time at I/O drivers.

Another object is an improved data processing system and method of operation which reduces the number of I/O pins switching values at any given time.

Another object is an improved data processing system and method of operation for generating phase alignment signals to control memory and system bus operation with respect to a central CPU clock.

Another object is an improved data processing system and method of operation having multiplexing operation of the memory and system interface buses with respect to the I/O pins.

These and other objects, features and advantages are achieved in a data processing system having a memory bus and a system input/output (I/O) bus including I/O drivers, the memory and I/O buses being controlled by a central processor unit (CPU) for transferring data therebetween and to the I/O drivers. A central clock provides clock signals to the CPU, the memory bus and the I/O bus. The central clock further provides memory and I/O phase alignment signals to the CPU, the alignment signals indicating to the CPU when the start of the CPU clock cycle coincides with the start of a memory bus clock cycle or I/O bus clock signal. Circuit means initiate the memory and I/O bus clock signals in alternate CPU clock signals to reduce the number of I/O pin switching at any given time when a memory or I/O bus switches thereby reducing the noise and power consumption at the I/O pins and in the system.

DESCRIPTION OF DRAWINGS

The invention will be more fully understood from the following detailed description of a preferred embodiment taken in conjunction with an appended drawing, in which.

DESCRIPTION OF PREFERRED EMBODIMENT

Figure 1:
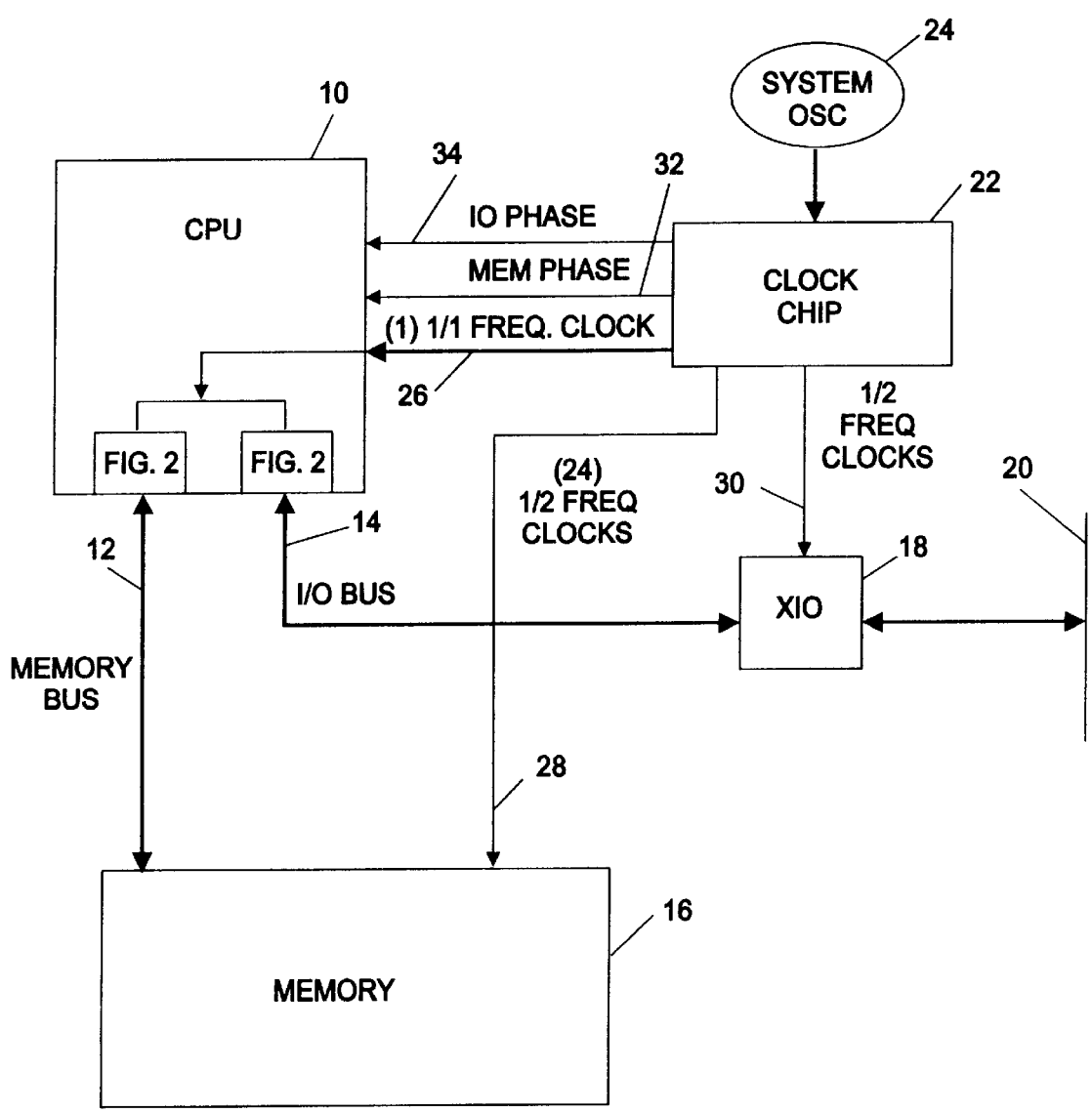
FIG. 1 is a block diagram of a partial data processing system which incorporates the principals of the present invention.

In FIG. 1, a central processing unit 10, for example, a POWER2(™) Microprocessor chip is coupled to a memory bus 12 and a system input/output (I/O) bus 14. The Microprocessor is described in an article entitled "Power2: Next Generation of RISC System/6000 Family" by S. White et al, published in the IBM Journal Of Research And Development, Vol. 38, Number 5, September 1994, Pages 493–502, which is fully incorporated herein by reference. The memory bus includes a data bus; address bus; memory control line and memory clock line, all not shown. The I/O bus includes a data bus; a control line and a clock line, all not shown. A description of the memory and I/O bus also appears in the article, supra. The memory bus 12 is connected to a conventional read/write memory array 16. The I/O bus 14 is coupled through input/output driver devices 18 to a communication systems 20, such as a local area or client/server network. The driver devices are conventional circuits coupling input devices such as keyboards, pen-based devices and the like to the CPU and providing output to displays, printers and the like included in data processing systems coupled to the communications network 20. A conventional clock chip 22 measures time by counting pulses of a crystal oscillator 24 operating at nominally 120–135 megahertz. The clock chip provides a 1:1 frequency clock on line 26 to the CPU, where the clock is up for a half cycle and down for a half cycle. The clock chip is also provides a 1:2 frequency clock on line 28 to the memory, and a 1:2 frequency signal on line 30 to the I/O drivers 18, where one cycle of the memory of I/O bus occurs for every 2 cycles of the CPU clock. The clock chip also provides the CPU with a phase alignment signal 32 which indicates to the CPU when the start of a CPU clock cycle coincides with the start of a memory bus clock cycle and a phase alignment signal 34 which indicates to the CPU when the start of a CPU clock cycle coincides with the start of an I/O bus clock cycle. By aligning the memory and I/O bus clocks with alternate CPU clock cycles, the number of I/O pins switching values at any given time will be reduced, as will be explained in more detail hereafter. Further such switching makes the power consumption in the CPU more evenly distributed in time, since a power surge most likely appears when many I/O pins switch simultaneously.

Figure 2:
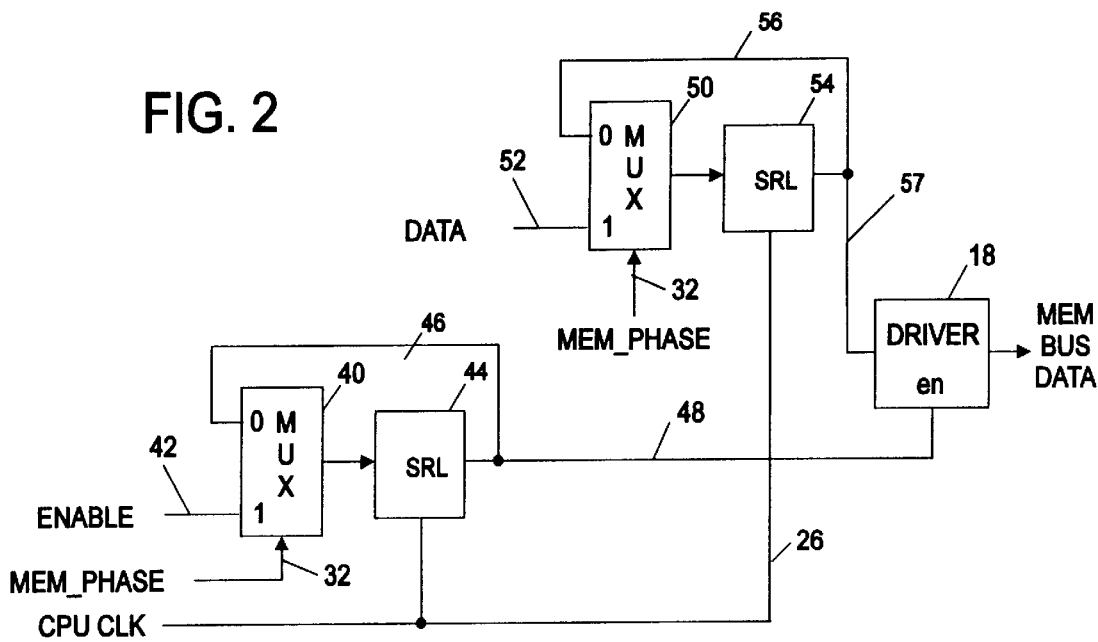
FIG. 2 is a circuit diagram of a switching circuit in each memory or I/O data bus line in the data processing system of FIG. 1 for controlling the transfer of data on the memory or I/O data bus relative to the CPU clock and the respective phase alignment signal.

In FIG. 2, a circuit is shown for aligning the data transfers on the memory bus and I/O data buses to be out of phase with respect to one another using the CPU clock as a reference. FIG. 2 is descriptive of the circuitry included in each memory data bus line. The same circuitry is included in each I/O data bus line, except the I/O phase alignment 34 is supplied to circuitry.

A multiplexor 40 receives an enable signal 42 which is originated by the CPU and the memory phase alignment signal 32. The output of the multiplexor is provided to a standard shift register latch 44 which also receives the CPU clock signal 26. The latch 44 provides a feedback signal 46 to the multiplexor 40 and an output 48 to the driver 18. The feedback signal retains the data in the latch when the memory phase signal goes low. The latch 44 transfers enable signal 42 over line 48 to activate the driver 18. Similarly, a multiplexor 50 receives a memory data bus input 52 and the memory phase alignment signal 32, the multiplexor providing an output to a shift register latch 54 which also receives the CPU clock 26. The latch 54 provides a feedback signal 56 to the multiplexor 50 for retaining the data at the latch when the phase alignment signal 32 goes low. The latch 54 also provides the memory data over the line 57 to the driver 18 which has been enabled to transmit the data to the communication system 20. The data transfer cycle is repeated the next time the phase signal 32 goes high. As indicated before each I/O data bus line has a similar circuit operation.

Figure 3:
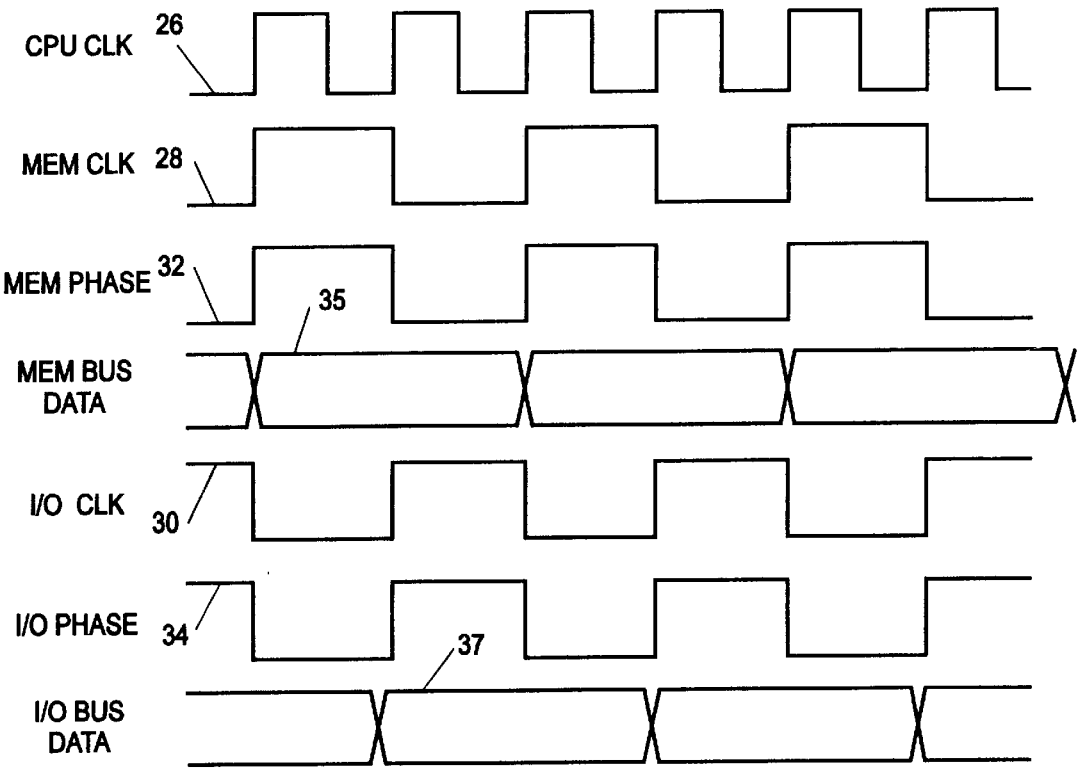
FIG. 3 is a timing diagram of the operation of the memory bus and system I/O bus of FIG. 1.

The operation of the alignment circuits in FIG. 2 will now be described in conjunction with FIG. 3. The CPU clock 26 is up for a half cycle and down for a half cycle. The memory clock 28 and phase clock 32 are up for one cycle of the CPU clock and down for the next cycle of the CPU clock, the memory data bus providing an output 35 over 2 cycles of the CPU clock. When the phase signal 32 is low, the CPU will sample data at the rising edge of the CPU clock for input signals and drive data at the rising edge of the CPU clock for output signals. When the phase signal 32 is inactive during the mid-cycle portion, the CPU clock rises to sample the memory bus 12. However, the inactive memory phase signal inhibits the CPU from sampling the bus 12 during mid-cycle or driving a new output value mid-cycle. Essentially, the multiplexors 40 and 50 are disabled by the phase signal 32.

The I/O clock 30 is displaced from the memory clock by one CPU cycle. During the inactive phase of the memory bus, the CPU samples data on the I/O bus when the clock rises and the phase alignment signal 34 is present. Thus, the I/O bus provides an output signal 37 on the I/O bus 14 one CPU cycle after the memory clock drives data on the memory data bus. When the CPU clock samples the memory bus, the next time the CPU clock rises, the I/O phase signal 34 is down which prevents I/O bus from being sampled at the same time the memory bus is sampled. Thus, the I/O drivers 18 switch at different times for the memory data and I/O data which makes power consumption more evenly distributed in time with reduced driver noise since all of the I/O pins are not switching simultaneously which would otherwise occur.

While the invention has been described with respect to a specific embodiment, various modifications may be made therein without departing from the spirit and the scope of the present invention as defined in the appended claims:

We claim:

1. A data processing system having input/output (I/O) drivers with reduced power consumption and noise level comprising:
   a) an external data bus including first I/O drivers;
   b) an internal data bus including second I/O drivers;
   c) a central processor unit (CPU) coupled to a memory and controlling the transfer of data on the external and internal data buses;
   d) a central clock providing to the CPU a CPU clock cycle signal; an external data bus phase alignment signal, and an internal data bus phase alignment signal, the central clock further providing a first and a second clock signal to the external and internal data buses, respectively; and
   e) means for initiating and including in each line of the external data bus and the internal data bus a logic circuit coupled to a phase alignment signal for the bus and the CPU clock cycle signal the first and second clock signals in conjunction with the phase alignment signals to transfer data on the external and internal data buses in alternate CPU clock cycle signals to alternate I/O driver switching on the external and internal data buses at any given time thereby reducing the noise level and power consumption in the system.

2. The data processing system of claim 1 wherein each logic circuit includes a multiplexor coupled to the phase alignment signal for the bus and a latch coupled to the CPU clock cycle signal.

3. The data processing system of claim 2 wherein one multiplexor is coupled to an enable signal and the other multiplexor is coupled to a data bus signal.

4. The data processing system of claim 2 wherein each logic circuit further includes a feedback circuit connected between the latch and the multiplexor.

5. The data processing system of claim 2 wherein each latch provides an output to the I/O driver included in the data bus line, and provides a feedback signal to the multiplexor to retain the latch output when the phase alignment signal is inactive.

6. The data processing system of claim 5 wherein the CPU clock cycle signal drives data on the data bus line when the phase alignment signal coincides with the CPU clock signal.

7. The data transfer system of claim 6 wherein the phase alignment signal prevents the CPU clock cycle signal from driving data on the data bus when the phase alignment signal is in a low state.

8. The data transfer system of claim 7 wherein each I/O driver provides an output when the enable signal and the data bus signal are provided to the logic circuits.

9. The data processing system of claim 1 wherein the external data bus phase alignment signal and the internal data bus phase alignment signal have a frequency which is substantially less than the CPU clock cycle signal frequency.

10. The data processing system of claim 9 wherein the internal data bus comprises a system and memory data bus and the external data bus comprises an I/O data bus.

11. The data processing system of claim 10 wherein the first clock signal is an I/O data clock signal.

12. The data processing system of claim 11 wherein the second clock signal is a system memory clock signal.

13. The data processing system of claim 12 wherein the first phase alignment signal is an I/O phase alignment signal.

14. The data processing system of claim 13 wherein the second phase alignment signal is a memory phase alignment signal.

15. In a data processing system including a central processor unit (CPU); a central clock; a memory; a memory bus and an input/output (I/O) bus, each bus having I/O drivers, a method of reducing power consumption and noise level in the system from simultaneous switching of the I/O drivers upon the occurrence of a memory or I/O data transfer operation, comprising the steps of:
   a) providing from the central clock a CPU clock cycle signal; a memory phase alignment signal and an I/O phase alignment signal to the CPU;
   b) providing from the central clock a memory clock signal to the memory bus and an I/O clock signal to the I/O bus;
   c) initiating a data transfer on the memory bus when the memory phase alignment signal coincides with the CPU clock cycle signal;
   d) initiating a data transfer on the I/O bus when the I/O phase alignment signal coincides with the next CPU clock cycle signal after the data transfer on the memory bus;
   e) using the CPU clock cycle signal to drive data on the memory or I/O bus when the CPU clock signal rises and the bus phase alignment signal for the bus is present; and
   f) suppressing the CPU clock cycle signal from driving data on the memory or I/O bus when the bus phase alignment signal for the bus is not present.

16. The method of claim 15 further including first and second logic circuits in the memory and I/O buses and comprising the steps of:
   a) providing an enable signal to the first logic circuit from the CPU and a data signal on the memory or I/O bus to the second logic circuit;
   b) providing an output signal from the first and second logic circuits to the I/O driver for the memory or I/O bus when the CPU clock cycle signal and phase alignment signal are present at the first and second logic circuits.

17. The method of claim 16 further comprising the step of:
   a) timing the clock signal to be a 2:1 relation for the phase alignment signals.

18. The method of claim 17 further comprising the step of:
   a) timing the memory and I/O phase alignment signals to initiate output signals from the I/O driver in the memory or I/O bus in alternate CPU clock cycle signals.

19. A data processing system having input/output (I/O) drivers with reduced power consumption and noise level comprising:
   a) an I/O data bus including first I/O drivers;
   b) a memory data bus including second I/O drivers;
   c) a central processor unit (CPU) coupled to a memory and controlling the transfer of data on the I/O and memory data buses;
   d) a central clock providing to the CPU a CPU clock cycle signal; an I/O data bus phase alignment signal, and a memory data bus phase alignment signal; the central clock further providing a first and a second clock signal in out of phase relation to the I/O and memory data buses, respectively; and
   e) a first and a second logic circuit coupled to a phase alignment signal for the bus and the CPU clock cycle signal, one logic circuit being coupled to an enable signal and the other logic circuit being coupled to a data bus signal, each logic circuit further including a feedback circuit connected between the latch and the multiplexor for transferring data on the I/O and memory data buses in alternate CPU clock cycle signals to reduce I/O driver switching on the I/O and memory data buses at any given time thereby reducing the noise level and power consumption in the system.

20. In a data processing system including a central processor unit (CPU); a central clock; a memory; a memory bus and an input/output (I/O) bus, each bus having I/O drivers, a method of reducing power consumption and noise level in the system from simultaneous switching of the I/O drivers upon the occurrence of a memory or I/O data transfer operation, comprising the steps of:

a) providing from the central clock a CPU clock cycle signal; a memory phase alignment signal and an I/O phase alignment signal to the CPU;

b) providing from the central clock a memory clock signal to the memory bus and an I/O clock signal to the I/O bus in opposite phase relation;

c) timing the clock signal to be a 2:1 relation for the phase alignment signals;

d) providing an enable signal to a first logic circuit from the CPU and a data signal on the memory or I/O bus to a second logic circuit;

e) providing an output signal from the first and second logic circuits to the I/O driver for the memory or I/O bus when the CPU clock cycle signal and phase alignment signal are present at the first and second logic circuits;

f) initiating a data transfer on the memory bus when the memory phase alignment signal coincides with the CPU clock cycle signal;

g) initiating a data transfer on the I/O bus when the I/O phase alignment signal coincides with the next CPU clock cycle signal after the data transfer on the memory bus;

h) using the CPU clock cycle signal to drive data on the memory or I/O bus when the CPU clock signal rises and the bus phase alignment signal for the bus is present; and i) suppressing the CPU clock cycle signal from driving data on the memory or I/O bus when the bus phase alignment signal for the bus is not present.

* * * * *